(12) United States Patent
Tung et al.

(10) Patent No.: US 7,064,800 B2
(45) Date of Patent: Jun. 20, 2006

(54) LCD WITH ALIGNMENT LAYER HAVING MULTIPLE ALIGNMENTS DEPENDING ON COLOR

(75) Inventors: Jen-Lang Tung, Kaohsiung (TW); Hau-Yuh Chang, Chu Pei (TW)

(73) Assignee: AU Optronics Corp., Hsinchu (TW)

( * ) Notice: Subject to any disclaimer, the term of this patent is extended or adjusted under 35 U.S.C. 154(b) by 166 days.

(21) Appl. No.: 10/890,089

(22) Filed: Jul. 14, 2004

(65) Prior Publication Data
US 2005/0105028 A1   May 19, 2005

(30) Foreign Application Priority Data
Nov. 18, 2003  (TW) ............... 92132280 A

(51) Int. Cl.
*G02F 1/1337* (2006.01)
(52) U.S. Cl. ............ 349/129; 349/123; 349/124; 349/108; 349/106
(58) Field of Classification Search ........ 349/124, 349/129, 123
See application file for complete search history.

(56) References Cited

U.S. PATENT DOCUMENTS
6,768,531 B1 *  7/2004  Ochiai et al. ............... 349/141

\* cited by examiner

*Primary Examiner*—Andrew Schechter
*Assistant Examiner*—Phu Vu
(74) *Attorney, Agent, or Firm*—Troxell Law Office, PLLC

(57) ABSTRACT

A gamma correction LCD panel and a fabrication of the same are provided. In the method, a lower substrate is firstly painted with a photo-alignment material. An exposing step is then introduced to have the photo-alignment material absorbed different amounts of light exposure so as to create various photo-aligning effects with respect to RGB pixel devices. The lower substrate is then assembled with an upper substrate and has an LC layer inter-filled. Upon such an arrangement, the LC layers with respect to RGB illumination can be thus provided with various transparencies for further adjust the RGB gamma curves individually.

19 Claims, 5 Drawing Sheets

(A)

(B)

LCD WITH ALIGNMENT LAYER HAVING MULTIPLE ALIGNMENTS DEPENDING ON COLOR

BACKGROUND OF THE INVENTION (1) Field of the Invention

This invention relates to a gamma corrected LCD panel, and more particularly to an LCD panel having its RGB gamma curves adjusted to a preset white-balance point. Also, the invention relates to a method for producing the aforesaid panel.

(2) Description of Related Art

Recently, liquid crystal displays (LCD) become more popular than ever as a displaying component used in personal digital assistants (PDA), notebooks (NB), digital cameras (DC), digital videos (DV), mobile phones, etc. Due to lack of self-illumination, a cold cathode fluorescent lamp (CCFL) is required in an LCD as a backlight source. In addition, the LCD also needs a liquid crystal (LC) driving circuit to decode the input signals into corresponding LC operation voltage levels so as to adjust the transparency of RGB pixels for achieving full-color imaging.

FIG. 1 depicts a typical relationship of pixel devices' transparency and the applied electric field. In FIG. 1, the horizontal axis is the applied electric field strength with a unit of voltage (V), and the vertical axis is the relative transparency. Three data curves referred respectively as R ("red"), G ("green"), and B ("blue") represent testing results of the pixel devices with particular displaying colors. As shown, the separation between any two curves implies that the LC layer in the pixel devices present different refractivity and different retardation value in response to different wavelengths of the passing-through visible light beams.

In order to quantify a look-up feeling of human eyes upon the LCD, gamma curves as typically shown in FIG. 2 are usually used to symbolize relationships between relative transparency and the bit numbers of the pixel devices. By having the transparency as a comparison basis between FIG. 1 and FIG. 2, a correlation between the bit number and the applied electric field can be established, and thereby the LC driving circuit can be designed much easier. However, the RGB gamma curves of FIG. 2 are separated to each other, and therefore it would be difficult to keep the combination of R, G, and B illuminations at a preset white-balance point. Also, bias in displaying color will definitely exist in response to the inputted displaying signals.

The arts to solve the separation problem in gamma curves as shown in FIG. 2 can be divided into two categories. One is to utilize electric circuit controlling means, and the other is to utilize structural adjusting means. In the latter category, efforts are provided to have the RGB pixel devices operating at LC layers with various thicknesses. FIG. 3 depicts a schematic cross-section view of such RGB pixel devices in accordance with the method targeting on varying LC layer thickness. As shown, each pixel device comprises an upper substrate 100, a lower substrate 300, and an interposed LC layer 200. Color filter layers 110R, 110G, 110B are formed on a lower surface of the upper substrate 100 to let the pixel devices show a preset color. Transparency organic layers 312R, 312G, 312B are formed on an upper surface of the lower substrate 300. Pairing of a pixel electrode layer 310 formed on the transparency organic layers 312 and a common electrode layer 120 under the color filter layers 110 creates an electric field E to drive the LC layer 200. Furthermore, two alignment films 130 and 320 are formed respectively on the inner surfaces of the common electrode layer 120 and the pixel electrode layer 310 to decide the orientation of the LC layer 200. As shown, the RGB pixel devices assign various thicknesses to the transparency organic layers 312 and the color filter layers 110, so as to vary local thickness of the LC layer 200.

It is well understood that the thickness of the LC layer 200, a spacing between the pixel electrode layer 310 and the common electrode layer 120, can severely affect the strength of the formed electric field E. Also, it is clear that the thickness of the LC layer 200 and the strength of the electric field E are both related to the transparency of the LC layer 200 and also the pixel device. Therefore, by assigning different thickness to the color filters 110R, 110G, 111B and the transparency organic layers 312R, 312G, 312B, the transparency of the LC layer 200 can then be adjusted and thereby the RGB gamma curves shown in FIG. 1 can have better coherence.

However, the above-described gamma adjusting method has the following drawbacks.

1. For additional steps of forming the transparency organic layers 312 with different thickness are needed before the step of forming the pixel electrode layer 310, so the fabrication cost will definitely increase.

2. The transparency organic layers 312R, 312G, 312B with various thicknesses can form respectively rough upper surfaces, on which the alignment film 320 is hard to form.

3. The pixel electrode layer 310 is known to be formed on the transparency organic layers 312 and thus it is lay on a rough surface formed by the aforesaid various thicknesses. Therefore, a lateral electric field may exist in the LC layer 200 to disturb normal operation of the pixel devices.

Accordingly, an improved gamma correction method in structure changes to avoid the above drawbacks is definitely welcome to the skilled in the art.

SUMMARY OF THE INVENTION

The object of the present invention is to provide an LCD panel that can well solve the forgoing separation problem in gamma curves, and a fabrication method for achieving so is also provided.

In a fabrication method of the present invention, an upper panel and a lower panel is firstly provided. A first photo-alignment film is then formed on an upper surface of the lower panel. The first photo-alignment film is purposely exposed to show various regions under respective exposure levels, in which each of the regions is related to a respective one of RGB pixels. Then, an LC layer is filled in the space between the upper and lower panels. The LC layer is therefore formed in accordance with the first photo-alignment film so as to show various transparencies purposely and thereby correct the RGB gamma curves of the LCD panel.

Reference will now be made in detail to the preferred embodiments of the present invention, examples of which are illustrated in the accompanying drawings. Wherever possible, the same reference numbers will be used throughout the drawings to refer to the same or like parts.

BRIEF DESCRIPTION OF THE DRAWINGS

The present invention will now be specified with reference to its preferred embodiment illustrated in the drawings, in which.

DETAIL DESCRIPTION OF THE PREFERRED EMBODIMENTS

It is well known in the art that a photo-alignment method usually utilizes ultra-violet (UV) light with certain polarization direction to expose an optical-sensitive polymer. The optical-sensitive polymer has a functional group to absorb UV illumination and perform molecular re-aligning, and the resulted molecular re-aligning is similar to the one by using traditional rubbing process. Because the optical-sensitive polymer needs the UV light exposing to show photo-alignment features, so exposure relative parameters such as exposure time, illumination power, and the propagation direction of the exposure light will definitely have influence on the photo-alignment.

Figure 4:
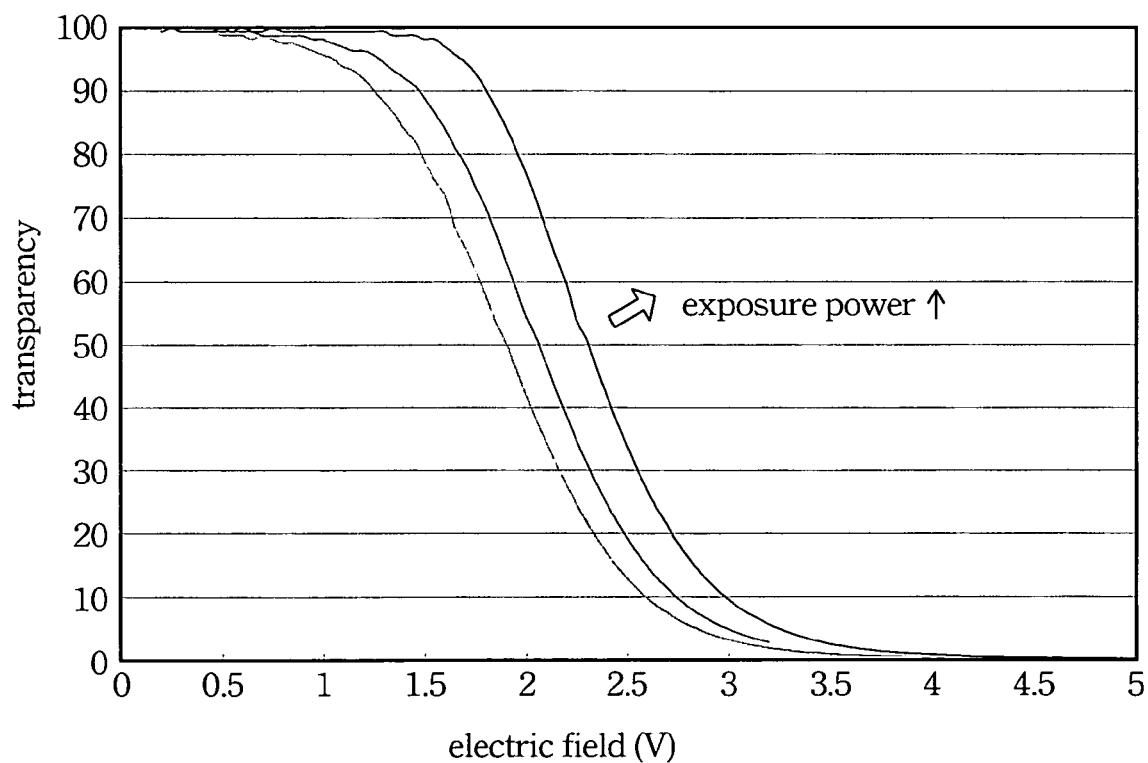
FIG. 4 is a plot showing photo-alignment layer's exposure levels with respect to transparency and electric fields of the LC layer in accordance with the present invention.

FIG. 4 represents a typical photo-alignment result. The lateral axis in FIG. 4 is the electric field applied to an LC layer, while the vertical axis is the relative transparency of the LC layer. Different data curves in FIG. 4 represent various exposure powers. As shown, as the exposure power increases, the data curve moves toward the right side of the figure and it implies that the electric field needed to drive the LC layer is increased to meet a preset transparency level.

Figure 5:
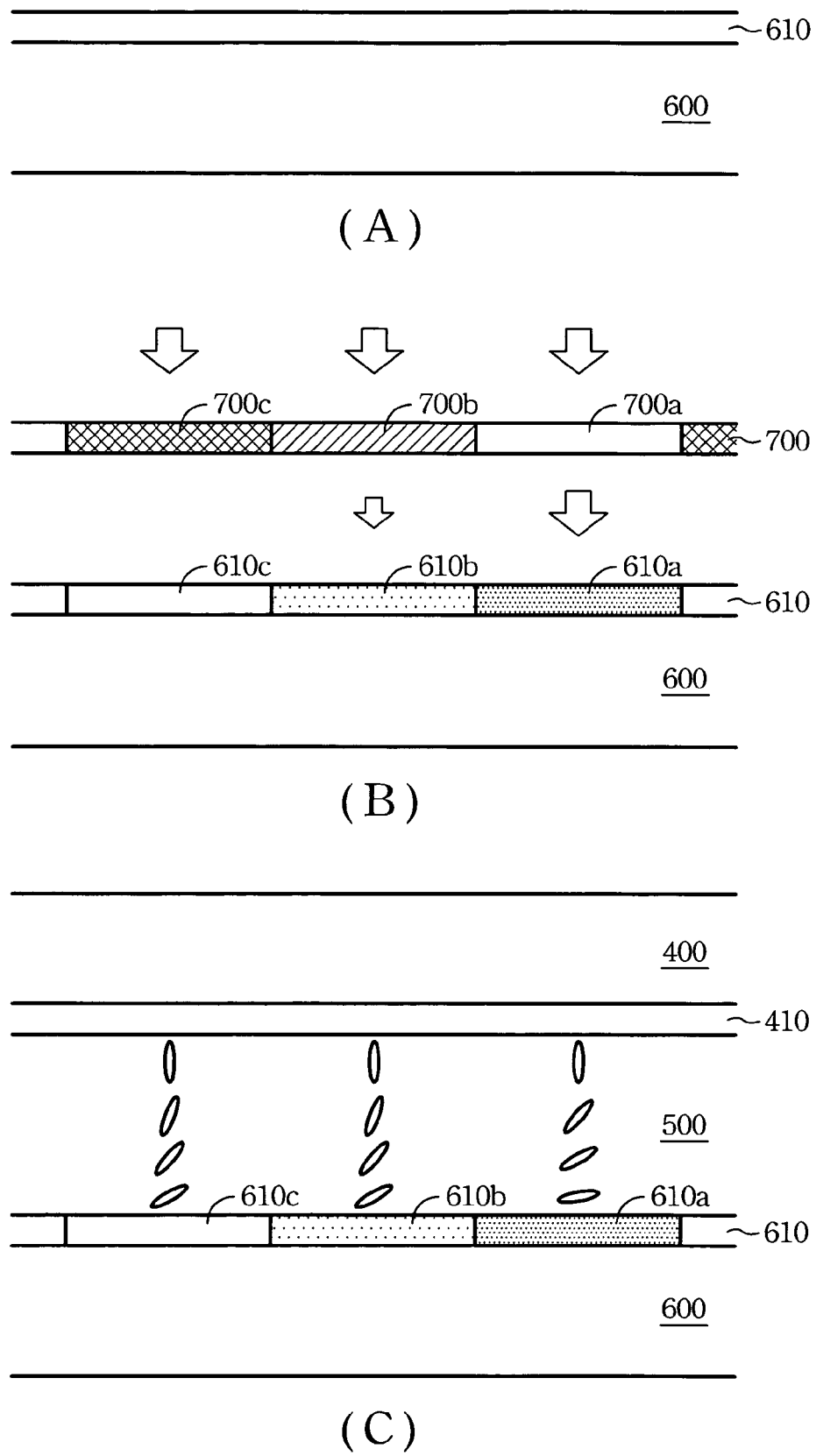
FIG. 5A to 5C depict schematic views of a first embodiment of a fabrication method to form a gamma corrected LCD panel in accordance with the present invention.

FIG. 5A to 5C shows a first embodiment of the fabrication method to form a gamma corrected LCD panel in accordance with the present invention. Firstly, as shown in FIG. 5A, a photo-alignment material is painted on an upper surface of the lower panel 600, and then the lower panel 600 is baked to remove the solvent in the photo-alignment material to form a cured photo-alignment film 610. Afterward, as shown in FIG. 5B, the photo-alignment film 610 is exposed through a half-tone mask 700, in which the mask 700 comprises regions with different transparency levels with respect to RGB pixels. Take the half-tone mask 700 in FIG. 5B for example, region 700a with respect to R pixels has a transparency level of 100%, region 700b with respect to G pixels has a transparency level of 50%, and region 700c with respect to B pixels has a transparency level of 0%.

For example, if there needs an exposure power ratio 10:9:8 to form respectively regions 610a, 610b, 610c in the photo-alignment film 610, a blank exposure process can be firstly carried out to expose the photo-alignment film 610 as a whole for the region 610c with respect to B pixels to obtain required exposure level, which is the lowest exposure level of the regions 610a, 610b, 610c. In the blank exposure process, the region 610b with respect to G pixels can have 8/9 of the needed exposure level, and the region 610a with respect to R pixels can have 8/10 of the needed exposure level.

Afterward, a half-tone mask 700 is used to expose the region 610a with respect to R pixel for letting the region 610a reach the needed exposure level. At the same time, the region 610b can receive an exposure level equal to half of the exposure level in the region 610a because the relative region 700b in the half-tone mask has a transparency level of 50%. Furthermore, the region 610c in the photo-alignment film with respect to B pixels is opaque and thus receives no exposure level in this exposing process. Therefore, after the exposure process accompanying with the half-tone mask 700, the regions 610a, 610b, 610c with respect to the RGB pixels can reach the preset exposure power ratio 8:9:10.

Finally, as shown in FIG. 5C, a liquid crystal layer 500 is filled into a space between the upper panel 400 and the lower panel 600, and a color filter (not shown in this figure) is formed on the LC layer 500 to result the RGB displaying colors. The liquid crystal layer 500 may be composed of nematic-type liquid crystal molecules, and the liquid crystal molecules right above the photo-alignment film 610 present a nearly lateral alignment event. The nematic-type liquid crystal molecules are affected by the photo-alignment film 610 with various regions of particular alignment contributions, thus the liquid crystal layers 500 of RGB pixels may present various transparencies and thereby the gamma curves may have better coherence.

Figure 6:
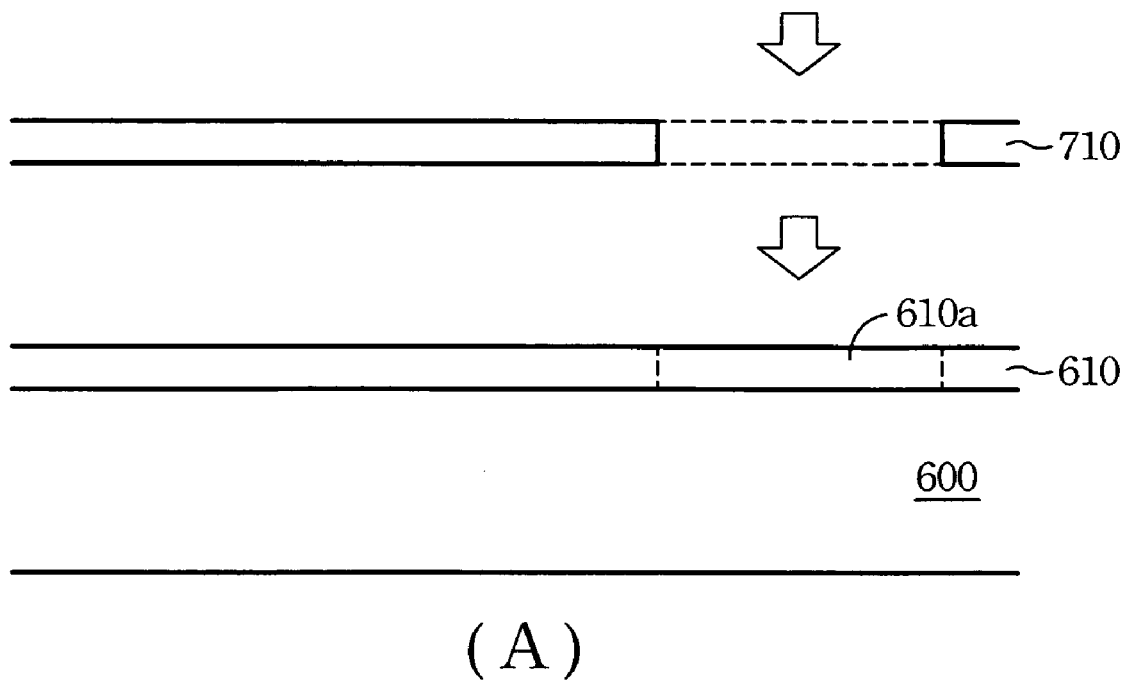
FIGS. 6A and 6B depict schematic views of a second embodiment of a fabrication method to form a gamma corrected LCD panel in accordance with the present invention.
Figure 6:
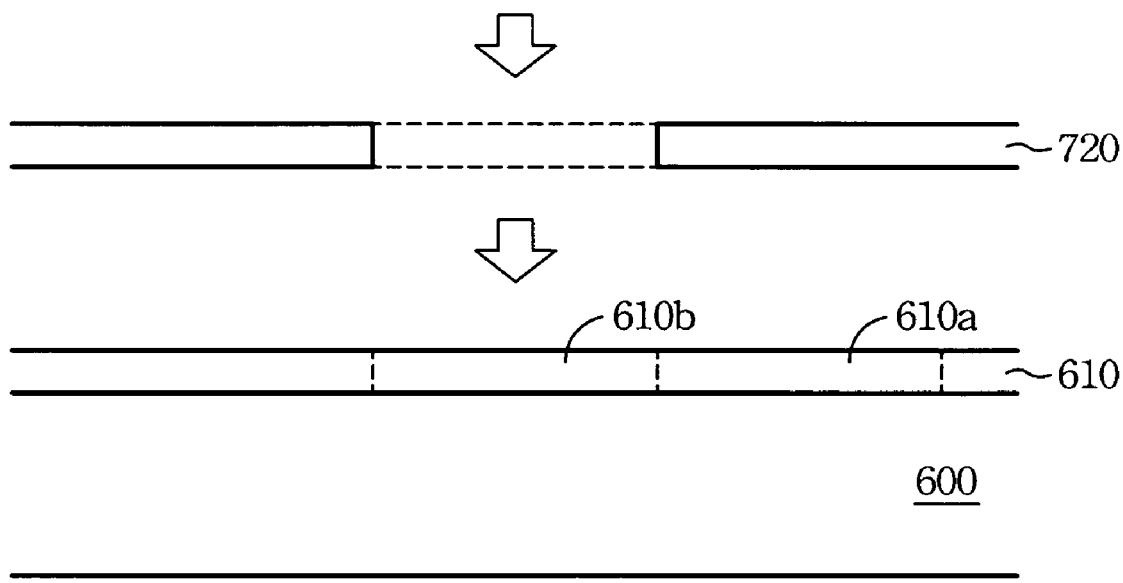

FIGS. 6A and 6B shows a second embodiment of the fabrication method to form the gamma corrected LCD panel in accordance with the present invention. In contract with the exposure process of FIG. 5B by using a half-tone mask 700, this embodiment uses two independent masks 710 and 720 with for red pixels and green pixels, respectively Firstly, as shown in FIG. 6A, the photo-alignment layer 610 is exposed through a first mask 710 to form an exposed region 610a with respect to the R pixels. Then, as shown in FIG. 6B, the photo-alignment layer 610 is exposed through a second mask 720 to form another exposed region 610b with respect to the G pixels.

For example, if there needs an exposure power ratio 10:9:8 to form regions 610a, 610b, 610c with respect to RGB pixels, a blank exposure process can be firstly carried out to expose the photo-alignment film 610 as a whole to achieve an exposure level equal to that needed for the region 610c with respect to B pixel. After the blank exposure process, the region 610b with respect to G pixel can have 8/9 the needed exposure level, and the region 610a with respect to R pixel can have 8/10 the needed exposure level.

Afterward, the first mask 710 is used to expose the region 610a so as to have the region 610a reach the needed exposure level. Then, the region 610b with respect to G pixel is exposed through the second mask 720 to have the region 620b reach the needed exposure level. After the exposure processes with the first mask 710 and the second mask 720, the regions 610a, 610b, 610c in the photo-alignment film 610 with respect to the RGB pixels can present the needed exposure power ratio 8:9:10. In the present invention, the exposure power in the two exposing processes with the first mask 710 and the second mask 720 can be determined by controlling the exposure time and the illumination power.

Moreover, in the present invention, a further promotion over the second embodiment can be rendered by using three masks with respect to R, G, and B pixels individually, in which three exposure steps can be expected to expose the regions 610a, 610b, 610c in the photo-alignment film 610 independently with various exposure levels. Yet, such an improvement is obvious to the skilled in the art after knowing the aforesaid of the present invention and thus will be omitted herein.

Figure 7:
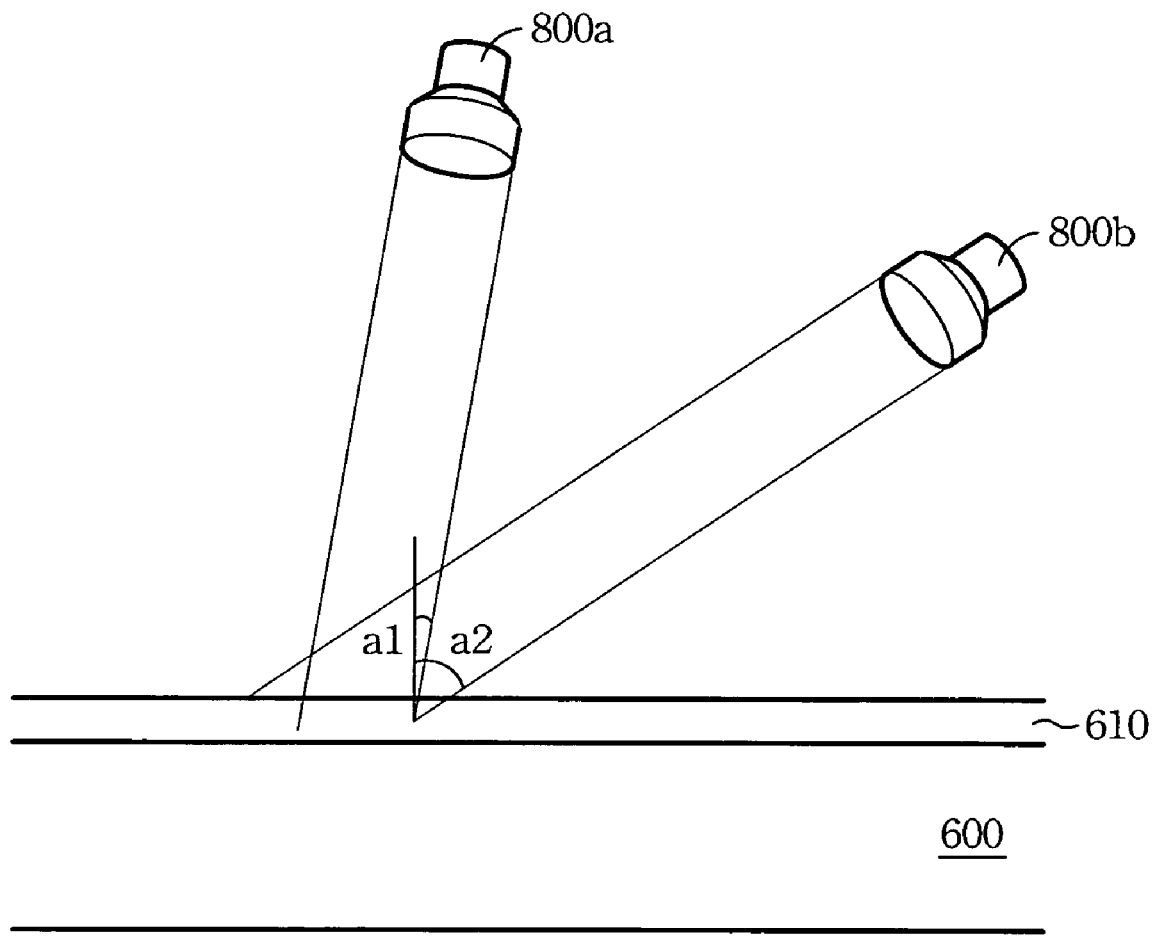
FIG. 7 depicts a schematic view of a third embodiment of a fabrication method to form a gamma corrected LCD panel in accordance with the present invention.

In the first and second embodiments, exposure time and illumination power are the only two parameters used to control the absorbed exposure level. However, in a third embodiment as shown in FIG. 7, the propagation direction of the exposure light beam is used to adjust the needed exposure level. As shown, two exposure light source 800*a* and 800*b* are shown, in which the propagation directions of the exposure light beams of the two light sources 800*a* and 800*b* make respective angles of a1 and a2 with respect to the normal direction (i.e. vertical direction) of the photo-alignment film 610. It is noted that as the angle between the light beam's propagation direction and the alignment film's normal direction increases, the exposure power per unit area will decrease accordingly. Thereby, it is possible to carry out three exposure steps with respect to RGB pixels by setting up three exposure light beams with predetermined propagation directions so as to expose the photo-alignment film 610 with expected exposure levels.

In the above three embodiments, only the photo-alignment film 610 formed on the lower panel 600 is concerned. Whereas, there may be another photo-alignment film, which is provided with an arbitrary pre-tilt angle alignment, formed on a lower surface of the upper panel 400 to drive the liquid crystal molecules more effectively.

Figure 1:
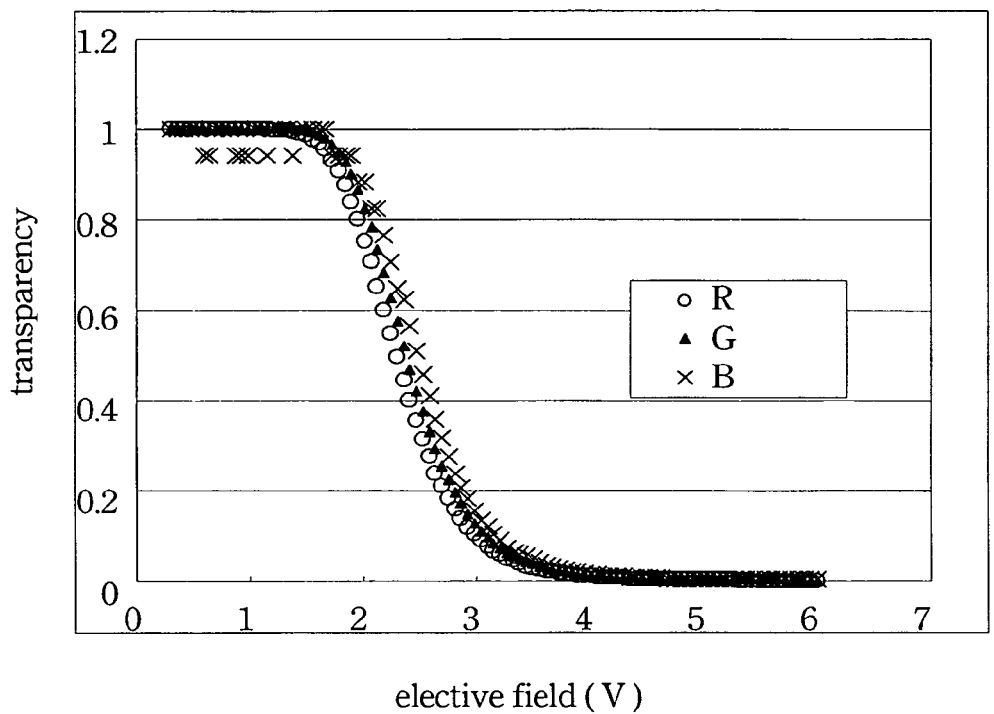
FIG. 1 is a plot showing the relationship of applied electric fields and relative transparency of traditional RGB pixel devices.
Figure 2:
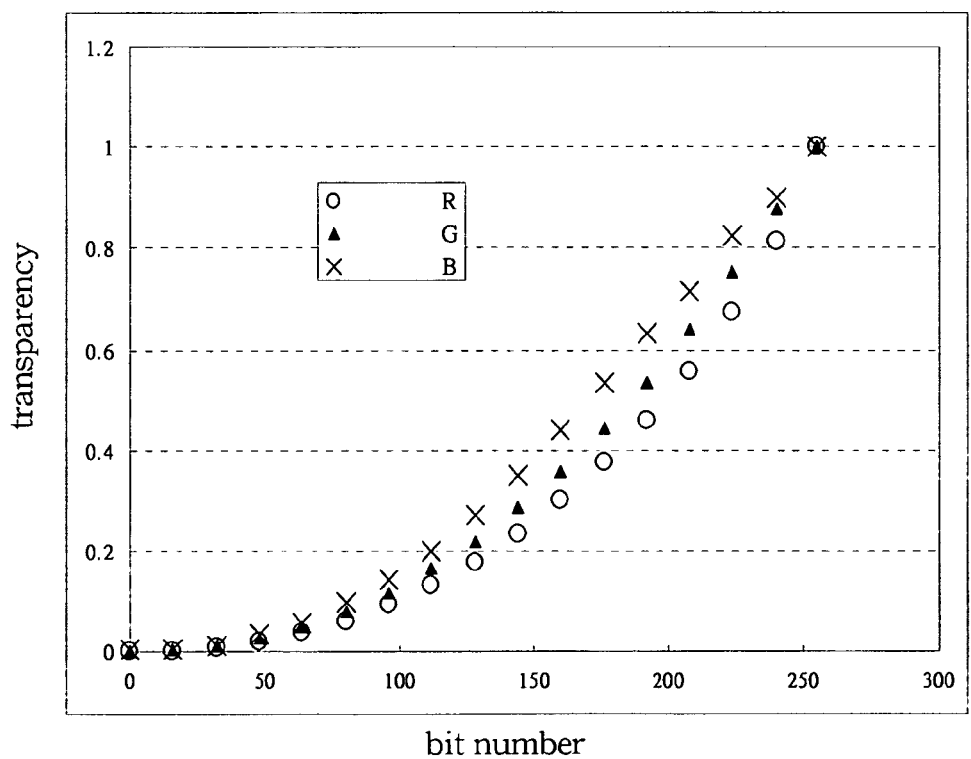
FIG. 2 is a plot showing gamma curves of traditional RGB pixel devices of FIG. 1.
Figure 3:
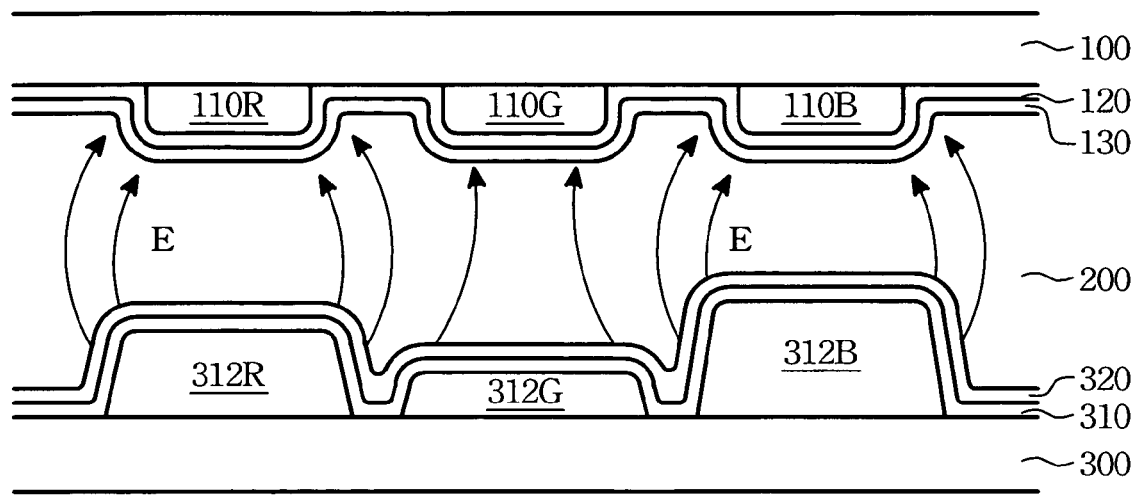
FIG. 3 depicts a schematic view of RGB pixel devices by using a traditional gamma correction method to adjust the thickness of LC layer.

In contrast to the traditional LCD panel of FIG. 3 who forms a transparency organic layer 312 to change the electric field strength in the liquid crystal layer 200, the LCD panel in accordance with the present invention has the following advantages.

1. In the present invention, a photo-alignment film 610 is used to present gamma correcting, and thus no transparency organic layer 312 is introduced to increase the fabrication cost.

2. By contrast to the formation of the alignment layers 130, 320 in the traditional LCD panel, which is hindered by the existence of the transparency organic layers 312, the process of forming the photo-alignment film 610 in accordance with the present invention is much easier as no transparency organic layers 312 exist.

3. The lateral electric field existing in the traditional LCD panel due to the thickness deviation of the transparency organic layers 312 is diminished in the LCD panel of the present invention.

With the example and explanations above, the features and spirits of the invention will be hopefully well described. Those skilled in the art will readily observe that numerous modifications and alterations of the device may be made when retaining the teaching of the invention. Accordingly, the above disclosure should be construed as limited only by the metes and bounds of the appended claims.

What is claimed is:

1. A method of fabricating a gamma corrected LCD panel comprising the steps of:
providing an upper panel and a lower panel;
forming a first photo-alignment film on the upper surface of said lower panel;
exposing said first photo-alignment film to show regions of different exposure levels and alignments with respect to RGB pixels; and
filling an LC layer between said upper panel and said lower panel, and having said LC layer effected by said first photo-alignment film to show different transparency respective to the regions of said first photo-alignment film to correct RGB gamma curves of the LCD panel.

2. The method of claim 1, wherein said first photo-alignment film is exposed through a half-tone mask by adjusting the exposure level.

3. The method of claim 2, wherein said half-tone mask comprises a fully transparency, a half transparency, and a opaque regions to form high, medium, and low exposure level regions in the first photo-alignment film with respect to the RGB pixels.

4. The method of claim 1, wherein the process of exposing said first photo-alignment film comprises two lithographic steps to expose the regions relative to the pixels of RGB colors.

5. The method of claim 3 further comprising a step to expose all the exposed surface of said first photo-alignment film with a lowest exposure level of the regions.

6. The method of claim 4 further comprising a step to expose all the exposed surface of said first photo-alignment film with a lowest exposure level of the regions.

7. The method of claim 1, wherein three independent lithographic steps are used to expose said first photo-alignment film with respect to RGB pixels.

8. The method of claim 7, wherein said three independent lithographic steps are applied with exposure light of different propagation direction to adjust the exposure level.

9. The method of claim 7, wherein said three independent lithographic steps are applied with different exposure time.

10. The method of claim 1 further comprising a step of forming a second photo-alignment film on a lower surface of said upper panel.

11. The method of claim 10 further comprising a step of exposing said second photo-alignment film to show regions of different exposure levels with respect to RGB pixels.

12. A gamma corrected LCD panel comprising:
a lower panel;
an upper panel mounted above said lower panel;
an LC layer interposed between said upper panel and said lower panel; and
a first photo-alignment film formed on the upper surface of said lower substrate showing regions of different alignments with respect to pixel devices of different displaying colors.

13. The gamma corrected LCD panel of claim 12, wherein said first photo-alignment film is provided with a lateral alignment.

14. The gamma corrected LCD panel of claim 12 further comprising a second photo-alignment film formed on a lower surface of said upper panel, and said second photo-alignment film showing regions of different alignments with respect to pixel devices of different displaying colors.

15. The gamma corrected LCD panel of claim 14, wherein said second photo-alignment film is provided with an arbitrary pre-tilt angle alignment.

16. The gamma corrected LCD panel of claim 12, wherein said LC layer is nematic aligned.

17. A gamma corrected full color LCD panel with a plurality of pixel devices formed on a lower panel, and each pixel device comprising:
three pixel electrodes providing operating voltages for displaying RGB colors;
a photo-alignment film, which is formed on said pixel electrodes, having three regions of different alignments with respect said pixel electrodes;
an LC layer formed on an upper surface of said photo-alignment film; and a color filter formed on said LC layer to result the RGB displaying colors.

18. The gamma corrected LCD panel of claim 17, wherein said photo-alignment layer is provided with a lateral alignment.

19. The gamma corrected LCD panel of claim 17, wherein said LC layer is nematic aligned.

* * * * *